United States Patent Office 2,873,001
Patented Feb. 10, 1959

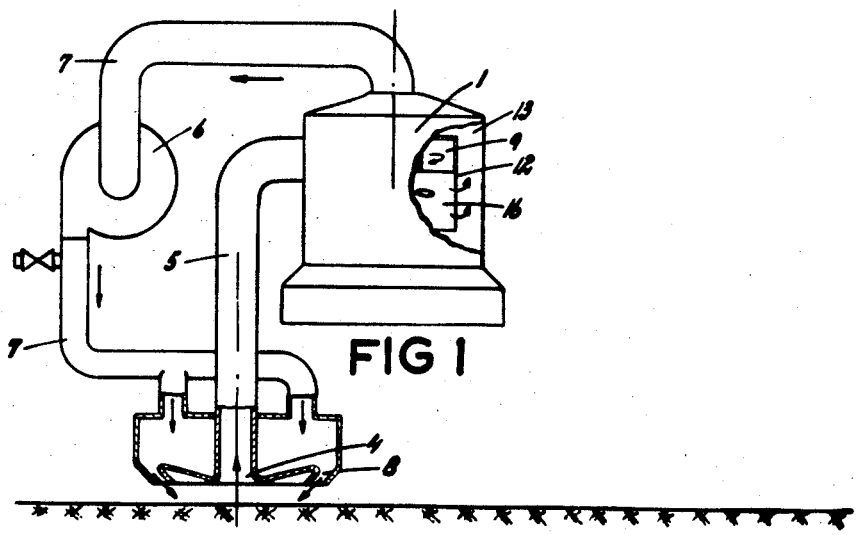
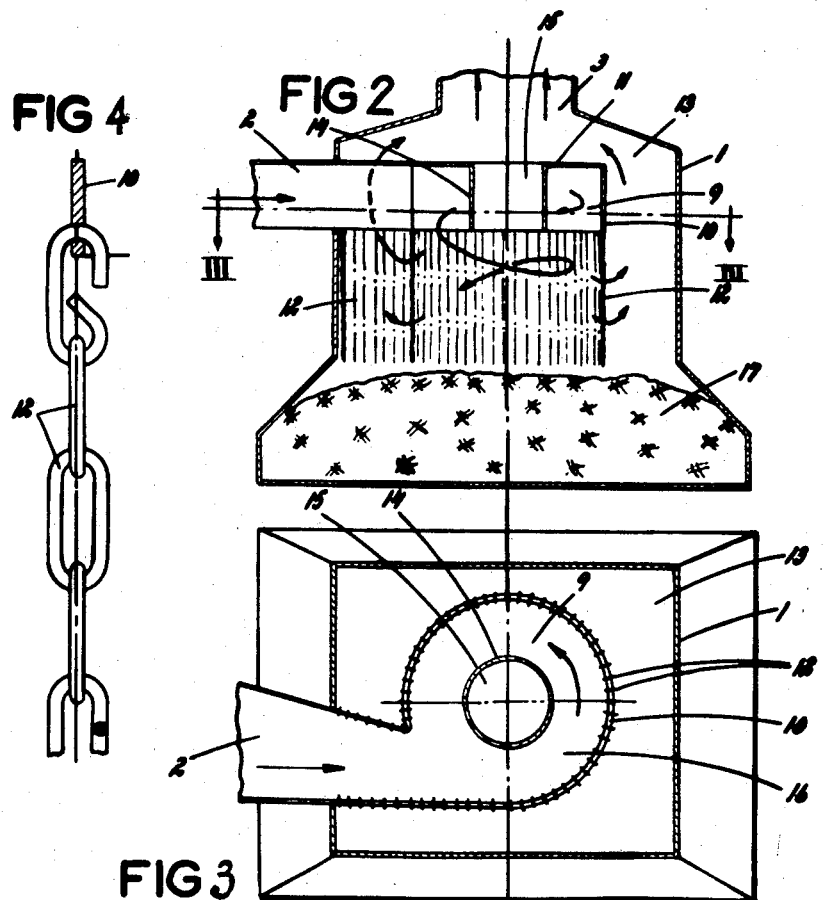

2,873,001

CYCLONE APPARATUSES FOR SEPARATING SOLIDS FROM FLOWING AIR OR OTHER GASES

Pontus Lauritz Gerdman, Malmo, Sweden, assignor to Aktiebolaget Åsbrink & Co., Limhamn, Sweden, a corporation of Sweden Application October 31, 1955, Serial No. 543,930

Claims priority, application Sweden November 8, 1954

5 Claims. (Cl. 183—58)

This invention relates to a cyclone apparatus for separating solids from flowing air or other gases.

A wide range of uses can be found for such an apparatus. In the present instance it will be described in connection with a street sweeping or cleaning machine in the form of a vehicle, e. g. a motor vehicle, provided with a unit operating with suction air or with both blowing air and suction air for cleaning the street and for conveying the sucked-up sweepings to a container on the vehicle in which the sweepings are separated from the air stream and collected, the container being emptied from time to time. A cyclone of the conventional type cannot possibly be used to advantage for the separation of the sweepings from the air stream, on one hand because, with a reasonable structural height of the cyclone, the collecting chamber for the solids separated in the cyclone from the air stream will not have the required large capacity if it tapers conically downwards in the hitherto usual manner, and on the other hand because the sweepings often contain leaves, paper and like objects which are not easily separated from the air stream or tend to adhere to and collect in the air passages of the cyclone, thereby jeopardizing its correct function.

The invention has for its object to provide a fully satisfactory solution of the problems outlined above as well as of other similar problems.

Further objects of the invention and advantages gained thereby will become apparent from the following description, reference being had to the accompanying drawing in which:

Fig. 1 is a diagrammatic side view, partly in section, of a street cleaning unit operating with both blowing air and suction air and having a cyclone apparatus according to the invention for separating the sweepings from the air stream.

Fig. 2 is a central vertical section of a form of the cyclone apparatus proper constituting part of the unit shown in Fig. 1.

Fig. 3 is a section on the line III—III of Fig. 2.

Fig. 4 is a view of a detail.

The cyclone apparatus comprises an upright container 1 which, in conformity with the general principle of a cyclone, has a laterally directed inlet 2 (Figs. 2 and 3) for the air stream adjacent its upper end and a central axial outlet 3 (Fig. 2) for the air stream in its upper end. A suction cleaning nozzle 4 (Fig. 1) is connected to the cyclone inlet 2 by means of a conduit 5. As shown in Fig. 1 the fan 6 required for producing the suction air stream through the suction nozzle 4 is inserted in a conduit 7 leading from the cyclone outlet 3 to a blowing nozzle 8 surrounding the suction nozzle 4.

As will appear from Fig. 3, the container 1 need not be round but may preferably be rectangular as seen in horizontal cross section. The inlet 2 opens tangentially into a chamber 9 which is round as seen in horizontal section and which is defined outwardly by a vertical wall 10 and at the top by a horizontal wall 11, the chamber being open at its lower end. From the lower edge of the vertical wall 10 there freely depend into the container 1 elongated movable elements 12 spaced short distances apart and having preferably the form of chains or like flexible members. A fractional view of one of said chains is shown in detail in Fig. 4. The chains 12 collectively form a foraminated screen which outwardly defines a downward extension of the downwardly open chamber 9 inside and below the unbroken wall 10 and 11, respectively, the arrangement being such that there is ample space 13 above the wall 11 as well as outside the wall 10 and the screen formed by the elements 12 depending from said wall into the container 1. The wall 11 which defines the upper end of the chamber 9 may preferably lie at a level with the upper edge of the air inlet 2, and the height of the wall 10 may preferably be equal to the vertical cross dimension of said air inlet 2, but it may vary within rather wide limits. The unbroken wall 10 may possibly be dispensed with and replaced by the foraminated wall or screen formed by the chains 12 which in such a case depend from the edge of the horizontal wall 11. The latter may also be foraminated but should preferably be unbroken. It is, however, preferably provided with a central opening and a cylindrical wall 14 depending from the edge of said opening to form a central axial passage 15 leading to the space 13 from the chamber 16 inside the screen formed by the chains 12. At the lower end the container 1 widens to form a spacious collecting chamber 17 for the solids which are separated in the cyclone from the air passing therethrough.

The air stream passing through the cyclone and the normal vibrations at the travel of the vehicle provided with the sweeping unit are sufficient to cause the chains 12 to shake or swing and strike or dash against one another and thus to vibrate or otherwise keep in motion rendering the screen self-cleaning. The refuse-laden air entering the cyclone through the inlet 2 flows tangentially into the round chamber 9 and therefore makes a rotary movement in said chamber and the extension 16 thereof, which is surrounded by the screen of chains, before it is discharged into the space 13, to a smaller portion through the central passage 15 and to the greater portion through the apertures in the screen of chains, and from said space 13 the air passes through the central outlet 3 at the upper end of the container 1. The rotation of the air in the chamber 9, 16 serving as the cyclone chamber, results in a separation of the solids accompanying the air and a deposition thereof in the collecting chamber 17 which has a door (not shown) or the like for the removal of the collected sweepings. By reason of the screen of chains such objects as leaves, paper and the like, which are otherwise very difficult to separate, are effectively separated by their getting caught by the screen of chains. Thanks to the vibration or like motion of the chains the objects caught by the screen are prevented from adhering to it and clogging the air passages therein, and are shaken loose from said screen and fall into the collecting chamber 17. Having passed through the screen to the surrounding space 13 in the container 1 the air flows so clamly and at so low a speed through said space 13 that particles which may have passed the screen of chains together with the air easily separate in the space 13 from the flowing air and sink to the bottom of the collecting chamber 17.

In a street cleaning machine of the type indicated by way of example for the utility of the invention, a very large quantity of air has to be sucked up per unit of time through the suction nozzle 4 and passed through the cyclone apparatus in order to be separated from the collected sweepings. The possibility of realizing such a street cleaning machine in practice was therefore found to be dependent on the provision of a cyclone apparatus of so reduced a height and size as to permit its accommodation on the vehicle, but nevertheless both of sufficient capacity and sufficient efficiency. The invention has made it possible to satisfy this requirement and also to give the cyclone collecting chamber for the sweepings separated so large a capacity as is required or desirable for practical reasons. At the same time the invention has made it possible to fulfil the prerequisite condition of connecting and utilizing the fan in the manner shown in Fig. 1 of the drawing. Arranged in this way, the fan would soon be clogged by leaves, paper and like objects getting caught therein if these objects had not been separated efficiently in the cyclone apparatus from the suction air stream to the fan.

While the cyclone apparatus according to the invention has been described above as forming part of a street cleaning unit operating with suction air, the invention is not restricted to the use of the cyclone apparatus for this special purpose. Neither is the invention limited to the form of the cyclone apparatus shown in and described above with reference to the drawing, since it may be modified structurally in different ways without departing from its basic characteristic features. For instance, the air-penetrable self-cleaning screen which defines the cyclone chamber 9, 16 at least to the greater part of its height and periphery and which in the form shown is constituted by the individually depending chains 12, may be formed instead by other elements that can be caused to swing, shake or vibrate individually possibly with the aid of a vibrator or the like.

What I claim and desire to secure by Letters Patent is:

1. A cyclone apparatus comprising a container having top, bottom and side walls and flared at its lower end to provide at said end a lower chamber for the collection of solids, the top wall of the container having a centrally-located air outlet of substantial size, a cyclone chamber located within the container and positioned below the top wall thereof to thereby provide spacing in the form of an upper chamber between the top of the cyclone chamber and the top wall of the container, the cyclone chamber having a tangentially-arranged air inlet having its entrance outwardly of said container, a top wall, a centrally-located annular wall defining an air passage from said cyclone chamber through the top wall thereof of less diameter than the air outlet in the top wall of the container, said passage being co-axial with the air outlet, the cyclone chamber having a wall arranged concentrically to and spaced outwardly from the annular wall, both the annular wall and the wall arranged concentrically thereto being of substantially the same depth and being connected at the top by said top wall of the cyclone chamber, wall arranged concentrically to said annular wall being provided with a dependent curtain of flexible chains, which chains are attached at their upper ends only to the lower end of said wall and are free to vibrate, move and frictionally contact one another for cleaning purposes, said curtain being spaced from the side and bottom walls of the container whereby an air space is provided between said curtain and said wall of the container, which air space is in communication with the chamber located between the top of the cyclone chamber and the top wall of the container.

2. A cyclone apparatus comprising a container having top, bottom and side walls and providing at its lower end a lower chamber for the collection of solids, the top wall of said container having an air outlet, a cyclone chamber located within the container and spaced below said top wall to provide an upper chamber between the top of the cyclone chamber and said top wall, the cyclone chamber having a top wall defining a centrally located air outlet passage from the cyclone chamber to said upper chamber, a wall extending downwardly from the top wall of said cyclone chamber concentrically to and spaced outwardly from said air passage, and a tangentially-arranged air inlet to said cyclone chamber having its entrance outwardly of said container, and further comprising flexible elements suspended at one end thereof from the lower end of said downwardly extending wall, the lower ends of said flexible elements being spaced from the bottom wall of said container and being free to move and frictionally contact one another at their lower ends, said downwardly extending wall and said flexible elements being spaced from the side wall of said container to provide an air space around the downwardly extending wall and the flexible elements, communicating with said upper chamber.

3. A cyclone apparatus in accordance with claim 2 wherein said container is flared at its lower end to provide an enlarged lower chamber.

4. A cyclone apparatus in accordance with claim 2 wherein said flexible elements comprise chains.

5. A cyclone apparatus in accordance with claim 2 wherein said tangentially arranged air inlet opens into said cyclone chamber immediately beneath said top wall thereof.

References Cited in the file of this patent

UNITED STATES PATENTS

| 1,035,822 | Green | Aug. 13, 1912 |
| 1,383,715 | Geschwind | July 5, 1921 |
| 2,542,635 | Davis et al. | Feb. 20, 1951 |

FOREIGN PATENTS

| 4,325 | Great Britain | Feb. 22, 1904 |
| 518,533 | France | Jan. 4, 1921 |
| 596,156 | France | Aug. 1, 1925 |
| 348,124 | Great Britain | May 8, 1931 |
| 659,545 | Germany | May 5, 1938 |
| 518,105 | Great Britain | Feb. 16, 1940 |
| 105,056 | Sweden | May 21, 1942 |